US007783982B1

(12) United States Patent
Reynolds et al.

(10) Patent No.: US 7,783,982 B1
(45) Date of Patent: Aug. 24, 2010

(54) PROGRAMMABLE ACTUATOR AND METHOD IN A NETWORK TERMINAL DEVICE

(75) Inventors: Billy E. Reynolds, Fort Worth, TX (US); Oscar R. Lewis, Hurst, TX (US); David K. Mathews, Fort Worth, TX (US)

(73) Assignee: RadioShack, Corporation, Fort Worth, TX (US)

( * ) Notice: Subject to any disclaimer, the term of this patent is extended or adjusted under 35 U.S.C. 154(b) by 797 days.

(21) Appl. No.: 10/953,304

(22) Filed: Sep. 29, 2004

(51) Int. Cl.
*G06F 3/00* (2006.01)

(52) U.S. Cl. .................. 715/747; 715/719; 715/738; 715/745

(58) Field of Classification Search .......... 715/704, 715/742, 744–747, 847, 864, 716, 719, 733, 715/738–739; 725/62, 86–104
See application file for complete search history.

(56) References Cited

U.S. PATENT DOCUMENTS

| 5,835,907 | A | * | 11/1998 | Newman ........................ 1/1 |
| 6,111,863 | A | | 8/2000 | Rostoker et al. |
| 6,122,520 | A | * | 9/2000 | Want et al. ............... 455/456.2 |
| 6,263,503 | B1 | | 7/2001 | Mangulis |
| 6,281,925 | B1 | | 8/2001 | Kosaka |
| 6,487,495 | B1 | * | 11/2002 | Gale et al. ................. 701/209 |
| 6,594,498 | B1 | | 7/2003 | McKenna et al. |
| 6,727,930 | B2 | * | 4/2004 | Currans et al. ............. 715/864 |
| 6,938,047 | B2 | * | 8/2005 | Kryeziu ...................... 707/101 |
| 7,010,758 | B2 | * | 3/2006 | Bate ........................... 715/841 |
| 7,221,901 | B2 | * | 5/2007 | Watanabe ................. 455/3.05 |
| 2002/0103019 | A1 | * | 8/2002 | Emmerson ................... 463/16 |
| 2002/0133824 | A1 | | 9/2002 | Mensch |
| 2003/0030751 | A1 | | 2/2003 | Lupulescu et al. |
| 2003/0137609 | A1 | | 7/2003 | Hayakawa |
| 2004/0054428 | A1 | * | 3/2004 | Sheha et al. ................... 700/56 |
| 2004/0148638 | A1 | * | 7/2004 | Weisman et al. ............. 725/115 |
| 2006/0190530 | A1 | * | 8/2006 | Gruneberg et al. .......... 709/203 |

OTHER PUBLICATIONS

"Nokia 3285 User Guide", Part No. 9353567, copyright 2001 Nokia Mobile Phones, available at http://nds2.Nokia.com/files/support/nam/phones/guides/3285_US_en.PDF.*

"KDDI to Launch Next-Generation au Services Across Japan in December Sales of New GPS Keitai and Movie Keitai to Start Simultaneously", KDDI Corporation Press Release Tokyo, Nov. 12, 2001, available at http://www.kddi.com/english/corporate/news_release/archive/2001/1112/index.html.*

(Continued)

*Primary Examiner*—William L Bashore
*Assistant Examiner*—Andrew Tank
(74) *Attorney, Agent, or Firm*—Dan Brown Law Office; Daniel R. Brown

(57) ABSTRACT

An apparatus and method for obtaining preferred information from a network by execution of a sequence of actions in response to a single actuation in a network terminal device. A sequence of actions is programmed in network terminal device. The sequence of actions are executed in response to a single actuation if a softkey. A network destination parameter and a user preference parameter are also programmed. The sequence of actions includes coupling a destination parameter into the network, upon receipt of a network reply message corresponding to said destination parameter, coupling a preference parameter into the network, and upon receipt of the preferred information from the network, outputting the preferred information from the network terminal device.

22 Claims, 7 Drawing Sheets

OTHER PUBLICATIONS

Samsung SPH-n400 series mobile telephone, as evidenced by "SPH-n400 Series Portable Tri-Mode Telephone User Guide", May 14, 2003, copyright 2003 Samsung Telecommunications America, Inc., available at http://downloadcenter.samsung.com/content/UM/200403/20040331110501109_SPH-N400bmc_English.pdf.*

* cited by examiner

PROGRAMMABLE ACTUATOR AND METHOD IN A NETWORK TERMINAL DEVICE

BACKGROUND OF THE INVENTION

1. Field of the Invention

The present invention relates to network terminal device user interfaces. More particularly, the present invention relates to preprogrammed and user programmable actuators that accomplish plural network interface and application tasks using a reduced number of actuator actuations.

2. Description of the Related Art

The advent of widely available network access delivering distributed software and data has been a great boon to the information society. The evolution of network deployment began with intra-facility wired networks, then grew to wired inter-facility networks, and has evolved to include wireless networks. Both proprietary and open network protocols have been deployed. The Internet, with its TCP/IP protocol has advanced to the forefront. However, many proprietary networks are coupled through the Internet, including a number of wireless networks. Wireless networks include commercial "cellular" services and a variety of local area wireless networks.

Networks allow users to share information and services over broad geographic regions, and even on a worldwide basis. Information and data conveyed through networks encompass virtually every aspect of human life. Science, business, the arts, politics, entertainment, medicine, broadcasting, research, and many other areas of human endeavor or processed and communicated through networks. Ultimately, there is a man-machine interface that allows users to engage in meaningful access through networks. Typically, a network terminal device is employed. Most network terminal devices are computing devices in their own right.

Network terminal devices frequently encompass a personal computing device, with a conventional display and keyboard, which provided the needed man-machine interface. In fixed locations, and even some mobile applications, the use of a conventional computer interface is useful. As network terminal devices have become smaller, and especially in wireless terminal devices, the size of the user interface has necessarily been reduced. A typical wireless telephone has a smaller display and fewer buttons than a personal computer, for example. The reduction in size of network terminal devices runs contrary to the ever-increasing amount of network data and services. These contrasting developments have placed a stress on networked service delivery and system design. Now, multiple user actions are required to achieve a desired result. Users enter data, parameters, and address information, and then interact with the network to achieve a desired result. This level of complexity in the user interface stifles growth of network delivered services and products. Thus, there is a need in the art for a apparatus and method to reduce the complexity of network terminal device user interface functional actions that are used to achieve execute network interaction.

SUMMARY OF THE INVENTION

The need in the art is addressed by the teachings of the present invention. A network terminal apparatus that is adapted to obtain preferred information from a network is taught. The apparatus includes an actuation means, a network communication means, an information output means, and a memory. The memory has a sequence of actions, a destination parameter and a preference parameter stored therein. A controller is coupled to the actuation means, and operates to recall and execute the sequence of actions in response to a single actuation of the actuation means. The sequence of actions includes coupling the destination parameter to the network communication means, and upon receipt of a network reply message corresponding to the destination parameter, coupling the preference parameter to the network communication means. Them, upon receipt of the preferred information, coupling the preferred information to the information output means.

In specific embodiments of the invention, the network communications means is an Internet terminal device or is a wireless terminal device operable to communicate with a wireless network. In other embodiments, the information output means is a visual display or an acoustic transducer, or a data communications port for coupling an external output device. The actuation means may be a user-actuated actuator, a software driven actuator, or a network message driven actuator. In another embodiment, the apparatus further includes plural actuation means that are coupled to the controller. Then, the memory stores plural sequences of events, plural destination parameters, and plural preference parameters, respectively, for each of the plural actuation means.

The destination parameter can be implemented in various ways. There are embodiment where the destination parameter is a relative network address or an absolute network address, embodiments where the apparatus includes a menu selection parameter or an application software specification, embodiments where the apparatus includes a search term for operation of a network search engine. In a specific embodiment, the apparatus further includes a means for storing the destination parameter, the preference parameter, and the sequence of actions in the memory. The means for storing may be manually accessible for programming by a user or it may be network accessible for remote programming through the network.

In another specific embodiment, the memory is preprogrammed with default values for the parameters and sequence of actions. In other embodiments, the preference parameter is implement in various ways. The preference parameter may include a search term for operation of a network search engine, or geographic metrics, or a video content specification, or application software configuration parameters, or temporal parameters, or probabilistic metrics.

In yet another specific embodiment, the controller further operates to save a current preference parameter upon completion of one action of the sequence of actions. In another, the controller further operates to format the preference parameter according to the network reply message. And in one embodiment, the controller further operates to communicate the preference parameter to a network site, and upon receipt of a corresponding preference parameter, it couples the corresponding preference parameter into the network.

The present invention also teaches a method of obtaining preferred information from a network by execution of a sequence of actions in response to a single actuation in a network terminal device. The method includes the steps of programming a sequence of actions that occur in response to the single actuation. The sequence of actions includes coupling a destination parameter into the network, and upon receipt of a network reply message corresponding to the destination parameter, coupling a preference parameter into the network. Then, upon receipt of the preferred information from the network, outputting the preferred information from the network terminal device.

In a specific embodiment of the method, the coupling steps are accomplished through a wireless terminal device. In another embodiments, the outputting step transfers the preferred information to a visual display, to an acoustic transducer, or through a data communications port to an external output device. In other embodiments, the single actuation is accomplished with a user-actuated actuator, a software driven actuator, or upon receipt of a network message.

The destination parameter can be implemented in various was in other specific embodiments. It may be a relative network address or an absolute network address, or in may include a menu selection parameter, or it may include an application software specification, or a search term for operation of a network search engine. In another specific embodiment, the method further includes the steps of programming the destination parameter and programming the preference parameter. The programming steps may be executed by a user or may be executed by remote programming through the network.

The preference parameter is implemented in a variety of ways in other specific embodiments. It can include a search term for operation of a network search engine, or include geographic metrics, or include a video content specification, or include application software configuration parameters, or include temporal parameters, or include probabilistic metrics. In yet another specific embodiment, the method includes the further step of saving a current preference parameter upon completion of one action of the sequence of actions. In another, the method includes the step of formatting the preference parameter according to the network reply message.

In another specific embodiment of the foregoing method includes the steps of communicating the preference parameter to a network site, and upon receipt of a corresponding preference parameter, coupling the corresponding preference parameter into the network. In another embodiment, the steps of coupling a destination metric parameter to an address server located in the network, and upon receipt of a destination parameter corresponding to the destination metric parameter from the address server, executing the coupling a destination parameter into the network are added.

In a particular embodiment of the present invention, a wireless network video terminal apparatus adapted to automatically obtain preferred video content from a network is taught. The apparatus includes an actuator and a wireless network transceiver adapted to communicate with a wireless network. It also includes a video display, and a memory for storing a sequence of actions, a network address and video parameters therein. A controller is coupled to the actuator, and operates to recall and execute the sequence of actions in response to a single actuation of the actuator. The sequence of actions includes communicating a first video parameter into the network address, and in response to receiving a first network reply message corresponding to the first video parameter, coupling a second video parameter into the network. The sequence further includes coupling the preferred video content to the video display upon receiving preferred video content corresponding to the video parameters.

In a refinement to the foregoing apparatus, the second video parameter includes a menu selection parameter. In another refinement, the memory is preprogrammed with default values for the sequence of actions, the network address and the video parameters. In another refinement, a fraction of the preferred video content is coupled to the video display. In yet another refinement, the apparatus further includes a first housing portion configured to support the actuator and the display, and a second housing portion pivotally coupled to the first housing portion, positionable at an open position and a closed position, and having a opening formed therein. The opening is formed such that the actuator and the display are accessible to a user while the second housing portion in at the closed position.

The present invention teaches a particular method of obtaining location information for a preferred entity based on geographic metrics gathered by a GPS receiver in a wireless terminal device that is operable to access a wireless network by execution of a sequence of actions in response to a single actuation in the wireless terminal device. The method includes the steps of recalling current geographic metrics from the GPS receiver, and communicating the current geographic metrics to an address server located in the network. Then, upon receipt of a physical address from the address server, corresponding to the current geographic metrics, communicating the physical address to a preferred entity network location, formatted to request a nearest preferred entity facility address. Finally, upon receipt of a nearest preferred entity facility address, displaying the nearest preferred entity facility address.

DESCRIPTION OF THE INVENTION

Figure 1:
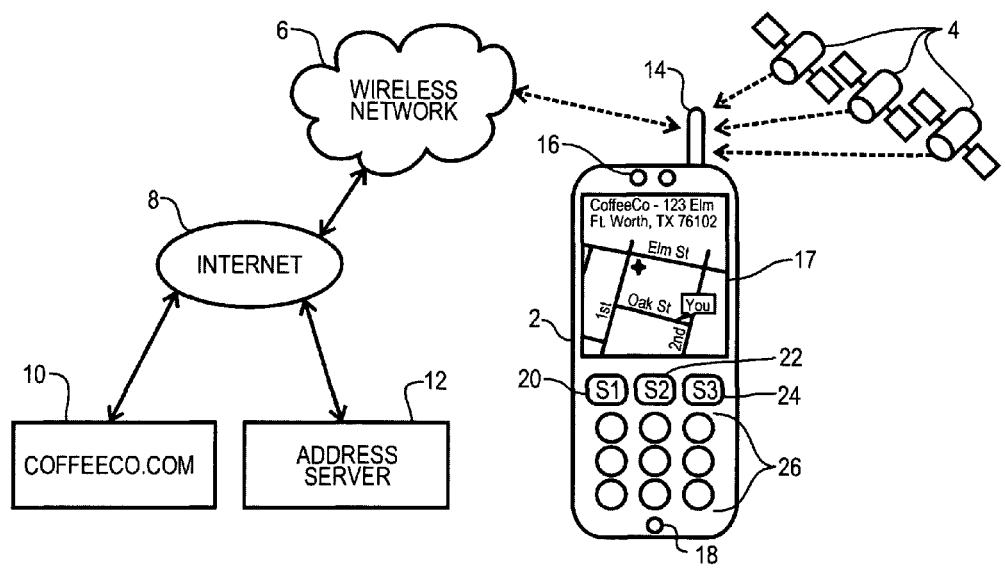
FIG. 1 is a system diagram of an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

Through application of the teachings of the present invention, users are able to obtain preferred information through a network with a greatly simplified user interface, typically requiring only a single actuation in a network terminal apparatus. Thus, the present invention replaces manually executed sequences of actions ordinarily needed to obtain preferred information. A "softkey" approach is employed in an illustrative embodiment, which automatically executes a sequence of actions that would otherwise require manual execution by a user. The sequence of actions can include keystrokes, transmission and reception of network messages, network searches, memory storage and recall operations, data formatting, display manipulations, and a variety of other network and terminal device actions. In fact, the softkey actuation may be initiated through the network or by a software function call so that the user doesn't actually have to actuate an actuator in order to access the benefits of the present invention. The preferred information is identified and processed based on a destination parameter and a preference parameter, which are integrated into a sequence of actions that process through the network, resulting in delivery of the preferred information to an output device of a type suitable for the particular preferred information.

One illustrative embodiment of the present invention teaches a flip-phone wireless telephone where the video display is visible when the phone is closed. The phone may operate in accordance with the CDMA, or other, wireless protocols, and receive video at adaptive, variable frames, rates depending on channel bandwidth capability. The phone has internal storage for received video streams, and can transfer the video files to external devices. Advance high fidelity audio is supported, such as Dolby version 5.1 surround sound. The illustrative embodiment video phone overcomes the limitation of prior art video phones that suffer from a complex user interface, which require users to manually access the service provider and navigate though a series of display screens and menus. The sequence of actions include selecting and downloading video display software applications, accessing and navigating password protected areas, selecting programming and enabling the viewing application, etc. The illustrative embodiment automates the foregoing steps into actuation of a single "TV" button. A first actuation of the button establishes service and downloads the necessary application software. Subsequent activations of the button automatically run the viewing application and tune to a default streaming video channel. If the user does not desire the default channel, an additional actuation of the button brings up a program guide from which another channel can be selected. The illustrative embodiment also provides for adaptive viewing modes, which aides in mitigating communications channel bandwidth limitations found is some wireless environments. In an adaptive viewing mode, a fraction of the viewing screen area can be requested and displayed, thus reducing the amount of data that needs to be transferred in the real-time, streaming modes of operation. For example, a financial information channel can be selected and the screen area limited to the lower section off the screen, where the market ticker symbols and trade prices run. Similarly, in sports and news programming, the banner section can be displayed to allow the user to view scores and breaking news along with the audio, without including the remainder of the image area.

Other illustrative embodiments incorporate preference parameters that are obtained from other systems. For example, GPS positional data can be advantageously used to locate a nearby facility from amongst plural facilities. The GPS position information, or geographic metrics, are received from a GPS receiver system and then forwarded into the network, together with a destination parameter. The destination parameter can be the URL address of a facility provider, such as a retail coffee shop chain. A single actuation of a softkey initializes a complex sequence of actions the recalls the geographic metric, forwards it through the network with the destination parameter, then receives the nearest location of a coffee shop, and formats and displays the preferred information to the user. FIG. 1 depicts such an illustrative embodiment.

Reference is directed to FIG. 1, which is a system diagram of an illustrative embodiment of the present invention. The illustrative embodiment of FIG. 1 applies the teachings of the present invention to the task of locating a nearby coffee shop, with a single actuation of a softkey 20, 22, or 24 on a wireless network terminal device 2. The wireless terminal device 2 is a third generation ("G3") wireless telephone, which is TCP/IP enabled for access to the Internet 8 through a wireless network 6, such as a GSM or CDMA network. Such wireless networks are known to those skilled in the art. The wireless telephone 2 includes an antenna 14 and the typical user interface components, including an earphone 16, a display 17, standard wireless telephone keypad 26, and a microphone 18. The illustrative embodiment wireless telephone also includes three programmable softkey actuators 20, 22, and 24. Each of these actuators can be individually programmed with a sequence of actions and corresponding destination parameters and preference parameters. The wireless telephone 2 also includes a global positioning systems ("GPS") receiver and antenna 14. Currently, wireless telephones with GPS or other positioning technology are being deployed in the United States and other countries.

The GPS receiver portion of the wireless telephone 2 receives plural signals from a constellation of GPS satellite 4 through antenna 14. The GPS system is known to those skilled in the art. The data output from the GPS receiver include latitude, longitude, elevation and time. In the illustrative embodiment, the latitude and longitude data constitute the geographic metrics, which are forwarded into the network in a network message as preference parameters. The destination parameter for the preference parameters is the URL of the CoffeeCo web site 10 in the illustrative embodiment. Note that the CoffeeCo web site is adapted to receive geographic metrics only in the form of a physical address, such as "123 Main Street", a ZIP code or other convention format. The softkey sequence of actions is preprogrammed to overcome this obstacle by first accessing an address server 12, which operates to convert the latitude and longitude geographic metrics to a physical address. The physical address is then forward to the CoffeeCo web site 10 in a subsequent network message. In operation, the user actuates a softkey 20, which automatically sequences through the preprogrammed sequence of actions to obtain the preferred information. Namely, receiving an address and a map to the nearest CoffeeCo coffee shop on the display 17 of the wireless telephone 2.

Figure 2:
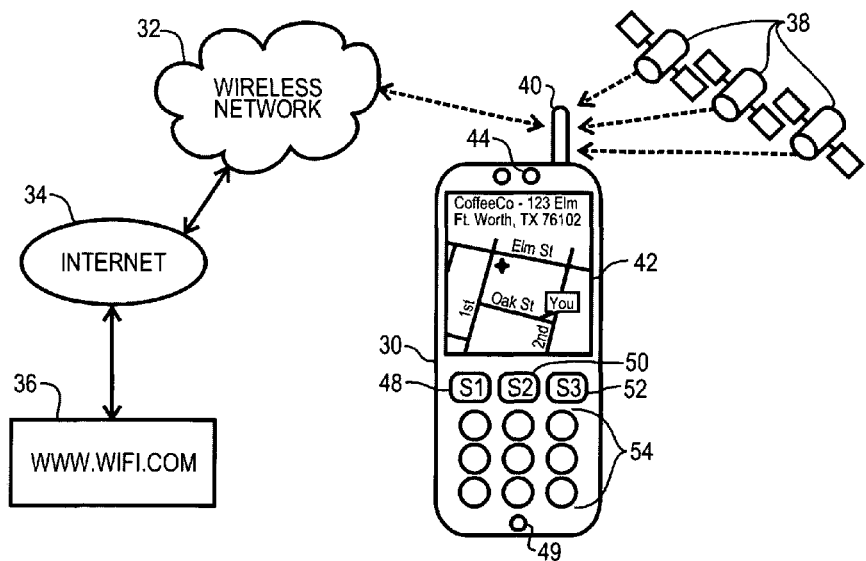
FIG. 2 is a system diagram of an illustrative embodiment of the present invention.

Reference is directed to FIG. 2, which is a system diagram of an illustrative embodiment of the present invention that locates the nearest WiFi HotSpot. A WiFi HotSpot is a wireless Internet access location, as are known to those skilled in the art. A G3 wireless telephone 30 receives GPS signals from the GPS satellite constellation 38 via an antenna 40. The telephone 30 includes the typical user interface components, including an earphone 44, a display 42, standard wireless telephone keypad 54, and a microphone 49. The illustrative embodiment wireless telephone also includes three programmable softkey actuators 48, 50, and 52. Actuation of a first softkey 48 initializes the automatic execution of a preprogrammed sequence of actions by the telephone 30. The sequence of actions includes communicating the current geographic metrics from a GPS receive into the wireless network 32 in a network message. The wireless network 32 is coupled to the Internet 34. The network message includes a destination parameter, which in the illustrative embodiment is the URL for the WIFI.COM server 36. In this embodiment, the server 36 is adapted to receive raw GPS latitude and longitude coordinates, and so an address server is not needed. The geographic metrics are the preference parameter in this embodiment, indicating the preference to find a HotSpot that is closest to the user present geographic location. The server 36 responds by sending a reply message that includes the address and map to the nearest WiFi HotSpot. In the example of FIG. 2, the nearest HotSpot is at a CoffeeCo shop located at 123 Elm Street.

Figure 3:
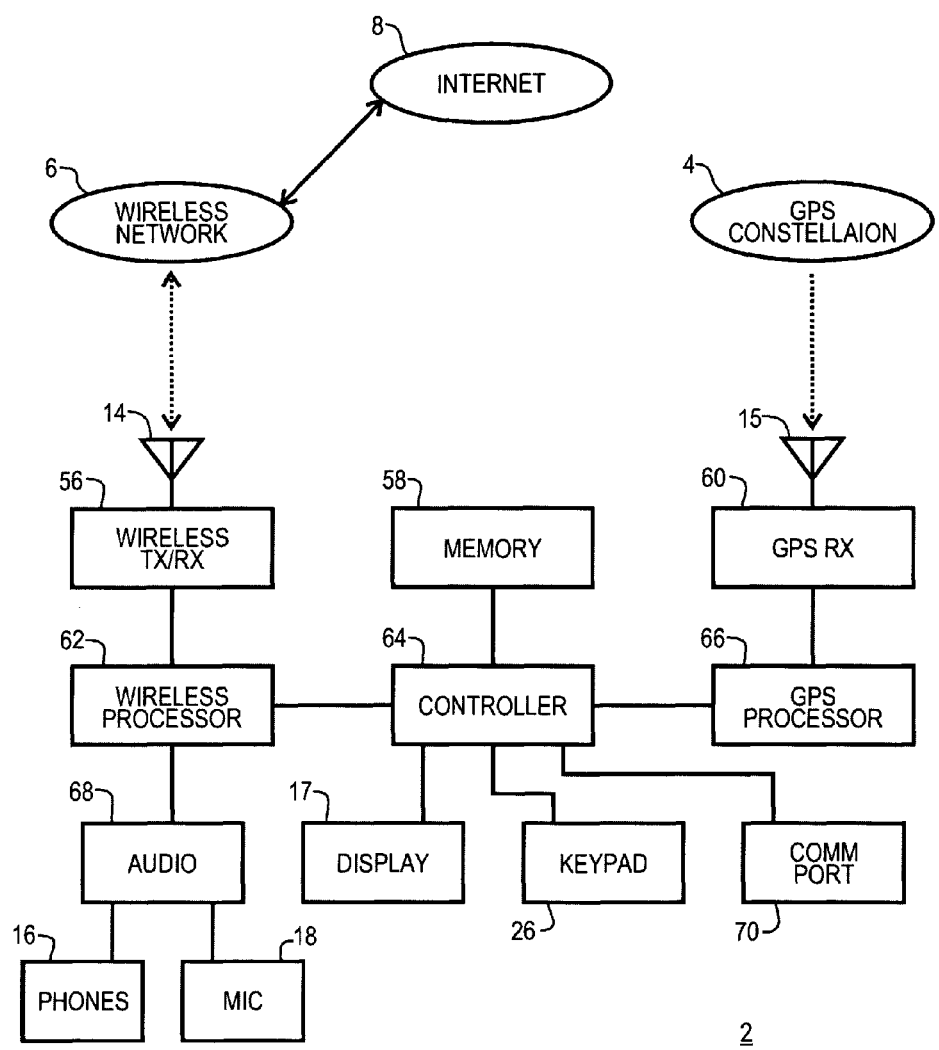
FIG. 3 is a functional block diagram of an illustrative embodiment of the present invention.

FIG. 3 is a functional block diagram of the illustrative embodiment described in FIG. 1. The wireless telephone 2 in FIG. 3 includes a wireless antenna 14 and a GPS antenna 15. Structurally, both antennas 14, 15 are disposed on the single ray dome 14, as illustrated in FIG. 1. The wireless antenna 14 in FIG. 3 communicates wireless signals with the wireless network 6. The wireless signals include all those signals utilized by a G3 wireless telephone network, including wireless protocol overhead, audio signals, data signals, TCP/IP signals, including network message signals. The wireless network can be a GSM network, CDMA network, or any other standard or proprietary wireless network protocol as are known to those skilled in the art, or that later become available. The wireless network 6 is coupled to the Internet 8, which enables access to the Internet by the wireless telephone 2 utilizing the TCP/IP transport protocol, as is known to those skilled in the art. The GPS antenna 15 receives GPS signals from the constellation of GPS satellites 4.

The wireless telephone 2 in FIG. 3 includes a GPS receiver 60 that receives GPS signals from GPS antenna 15. The receiver couples the demodulated GPS signals to a GPS processor 66, which outputs the GPS coordinates, including latitude, longitude, elevation, and time to main controller 64. As noted above, the latitude and longitude constitute the geographic metrics in the illustrative embodiment. A wireless transceiver 56 couples wireless signals with the wireless network 6. The demodulated wireless signals are coupled with wireless processor 62, which couples data signals with main controller 64, as well as audio signals with audio circuit 68. Note that wireless transceivers and wireless processors are known to those skilled in the art. The data signals coupled between the wireless processor 62 and the main controller 64 include network messages, which carry destination parameters and preference parameters, as well a preferred information. Note that the wireless processor 62, GPS processor 66, and the main controller 64 may be discrete computing devices, or they may be combined into one or more discrete computing devices. A digital signal processor is a suitable device for implementing these functional components.

A memory 58 is coupled to main controller 64, which provides storage for object code software as wells a preprogrammed sequences of action, destination parameters, preference parameters, and preferred information. The size of memory 58 is scaled to meet the requirements of the illustrative embodiment. An audio circuit 68 is coupled to the wireless processor 62, and serves to condition audio signals to and from the earphones 16 and microphone 18, respectively, of the wireless telephone 2, as is customary in wireless telephones. It should be noted that preferred information might be in the form of audio information, such as a user's favorite song, the spoken word, or other audio content. In such an instance, the earphone 16 is used as the output device for the preferred information. In other embodiments, the preferred information is visual, in which case the display 17 is used as the output device. The display 17 is coupled to main controller 64, which drives the display with preferred information, typically recalled from memory 58 after having been received from the wireless network 6.

A communications port 70 is coupled to the main controller 64. The communications port 70 may be a serial port, such as USB port, or other communications port known to those skilled in the art. The communication port 70 can be used as an output connection to and external output device (not shown). For example, an external computing device or peripheral may be the desired output device for received preferred information. The communication port 70 can also be utilized and input port for receiving a preprogrammed sequence of actions or preference and destination parameters from and external computing device. In one embodiment, sequence of action and parameters are created in a personal computer that has a convenient user interface. Once created, this information is transferred to the wireless telephone through communications port 70.

Figure 4:
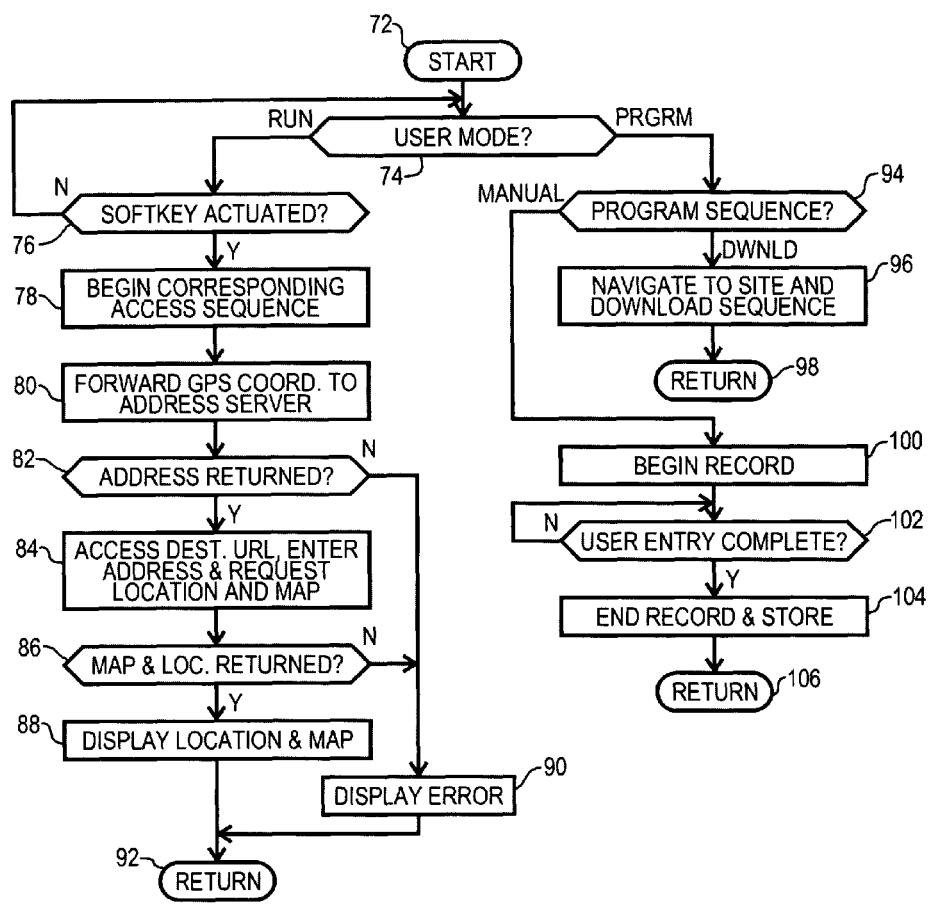
FIG. 4 is a process flow diagram of an illustrative embodiment of the present invention.

Reference is directed to FIG. 4, which is a process flow diagram of an illustrative embodiment of the present invention. The process illustrated in FIG. 4 is generally directed to locating preferred information based on geographic metrics, in a similar fashion as discussed with respect to FIG. 1. The process begins at step 72 and proceeds to step 74, where a test is made to determine whether the process is in "run" mode or "program" mode. Program mode is used to program sequences of action, and sometimes destination parameters and preference parameters. Run mode is used to execute softkey sequences of action after they are programmed. Assuming that "program" mode has been selected at step 74, flow continues to step 94, where a test to determine whether a manual programming sequence is to be entered or whether a sequence will be downloaded from another computing device or the network. If the download mode has been selected at step 94, then flow proceeds to step 96 where a sequence is selected and transferred to the memory of the device. The location of the downloaded sequence can be either a network site with a menu of options or a locally connected computing device, via a communication port. Once the desired sequence has been selected and transferred, flow proceeds to step 98, which returns to step 72. On the other hand, at step 94, is the manual programming mode has been selected, then flow proceeds to step 100, where a macro recording mode is entered. In macro recording mode, the process records every step that is manually executed by the user. In this mode, not only the key actuation sequences are recorded, but so too are the menu choices made and variables entered and other data. When appropriate, the destination parameter and preference parameters may be recorded as well. Once the user manual entry is complete at step 102, flow proceeds to step 106, which returns to step 72.

Returning now to step 74 in FIG. 4, if the user has selected run mode, then flow continues to step 76, where the process awaits actuation of a softkey. Note that actuation can be by manual activation, by software activation, or by an activation message received through the network. Once an actuation event occurs at step 76, flow proceeds to step 78, where the process begins sequencing through the corresponding sequence of actions that were previously recorded. In the illustrative embodiment, the sequence of actions is designed to locate a retail establishment based on the current geographic location of the user and the device. This portion of the process begins at step 80, where the process recalls and forwards the geographic metrics to an address server. The URL of the address server is provided during the aforementioned programming sequence. Once the geographic metrics are sent at step 80, flow proceeds to step 82, where a network reply message is expected. That message should include the user's current closest physical address. If the message is not timely received, then flow proceeds to step 90 where an error message is provided to the user. Otherwise, if the address is received form the address server at step 82, flow proceeds to step 84.

At step 84, the process sends a network message that includes the URL of the retail establishment web site together with the physical address that was received from the address server. Note that this sequence of actions includes both fixed data, such as the URL of the retail web site, and also transient data, such as the current address received from the address server. At step 86 a network reply message is expected. In the illustrative embodiment, that message should include a textual description of the nearest retail location and a graphic map. If this information is not timely received, then flow proceeds to step 90 where an error message is displayed. On the other hand, at step 86, if the address and map are received, then flow proceeds to step 88. At step 88, the map and address are displayed to the display of the device. From either step 88 or error message step 90, flow proceeds to step 92, which returns the process.

Figure 5:
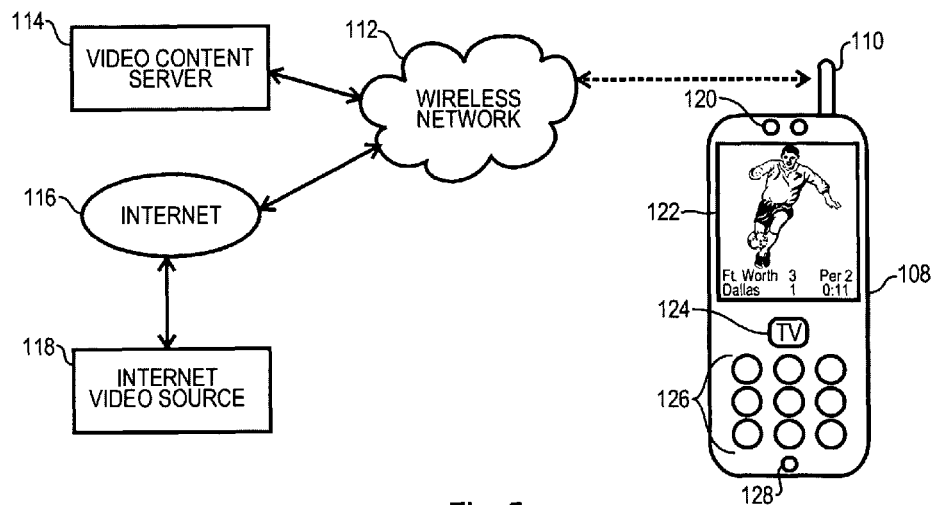
FIG. 5 is a system diagram of an illustrative embodiment of the present invention.

Reference is directed to FIG. 5, which is a system diagram of an illustrative embodiment of the present invention. FIG. 5 illustrates an embodiment that utilizes the teachings of the present invention to access streaming video content by a wireless network terminal device with a single key actuation. A G3 wireless telephone 108 includes the usual user interface components, including an earphone 120, a display 122, a keypad 126, and a microphone 128. The display is adapted to reproduce streaming video content. A single actuator 124 is labeled as "TV" indicating its function to the user. In operation, the user actuates the TV button 124, which causes the wireless telephone 108 to automatically execute a preprogrammed sequence of actions. Included within that sequence of actions is a destination parameter, which indicates the network location of the preferred video information, and a preference parameter, indicating which video channel or program is preferred. In operation, the user actuates the TV button 124, which begins execution of the sequence of actions. The telephone 108 communications network messages via antenna 110 to a wireless network 112. The video content may be located at a dedicated video content server 114 coupled directly to the wireless network 112, or may located at a web site 118 coupled through the Internet 116 to the wireless network 112.

Figure 6A:
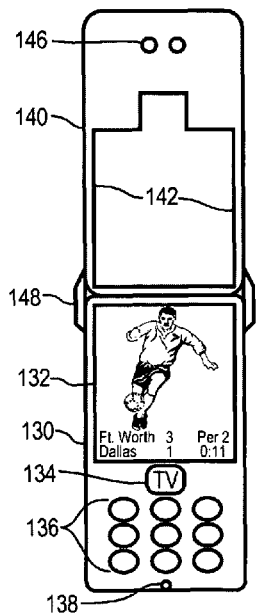
FIG. 6a and FIG. 6b are drawings of a wireless terminal device according to an illustrative embodiment of the present invention.
Figure 6B:
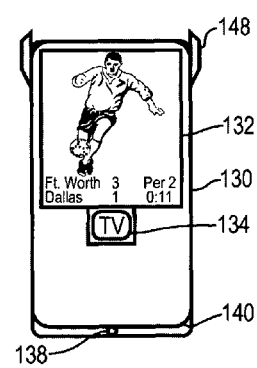

FIG. 6a and FIG. 6b illustrate a variation of the wireless video terminal application illustrative embodiment. The device 130 is a G3 wireless telephone that includes the customary user interface components, including an earphone 146, a display 132, a telephone keypad 136, and a microphone 138. The "TV" button actuator 134 is disposed on the exterior of the telephone 130. A flip-cover 140 is rotatably coupled to the main housing 130 by a pair of hinges 148. The flip cover 140 has an opening 142 formed therein. The opening 142 is formed so that the bulk of the user interface items are covered when the flip cover 140 is rotated adjacent to the main housing 130. However, the opening is formed so that the TV button 134 and display 132 remain visible, even when closed. This arrangement utilizes the single actuation feature of the present invention in a convenient and useful way. Since the user can access their preferred video content with a single actuation of a single button, only that single actuator and the display need be exposed while the flip-cover 140 is closed. This presents a compact and simple device for viewing streaming video in one application, and a complete wireless telephone in another mode, with the flip-cover 140 open.

Figure 7:
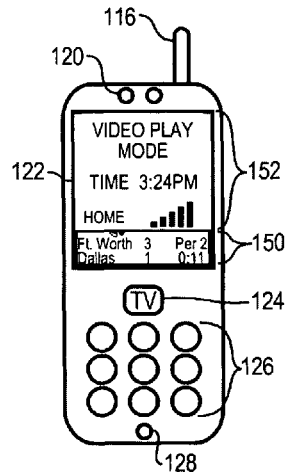
FIG. 7 is a drawing of a wireless terminal device according to an illustrative embodiment of the present invention.

Again considering FIG. 5, note that the illustration of the display 122 shows the entire video frame presented for viewing. This can be problematic is some streaming video display applications, as the effective bandwidth of some wireless networks is not sufficient to stream full frame video at acceptable frame rates. Thus, a trade off must be made, either reducing resolution of each frame or reducing the frame rate to adapt to the available effective bandwidth. The teachings of the present invention address this issue, which is illustrated in FIG. 7. FIG. 7 is a drawing of the wireless terminal device 122, in a specific embodiment of the present invention. The sequence of actions preprogrammed for execution include a parameter to limit the area of the video frame that is transferred during streaming. This reduces that amount of data that must be transferred with each video frame. During the programming mode, a specific section of the frame is defined for streaming video transfer. In FIG. 7, the lower portion of the video frame 150 is displayed on display 122. The upper portion of the display 152 is then used to display conventional wireless telephone and operational information, as illustrated. The transmission of a fraction of the video display is useful in a variety of instances. In the illustrated embodiment, the score and time banner from a sporting event are displayed. In financial programming, the ticker symbol banner can be transmitted. Cable and network news programs often provide a news ticker banner that could likewise be selected.

Figure 8:
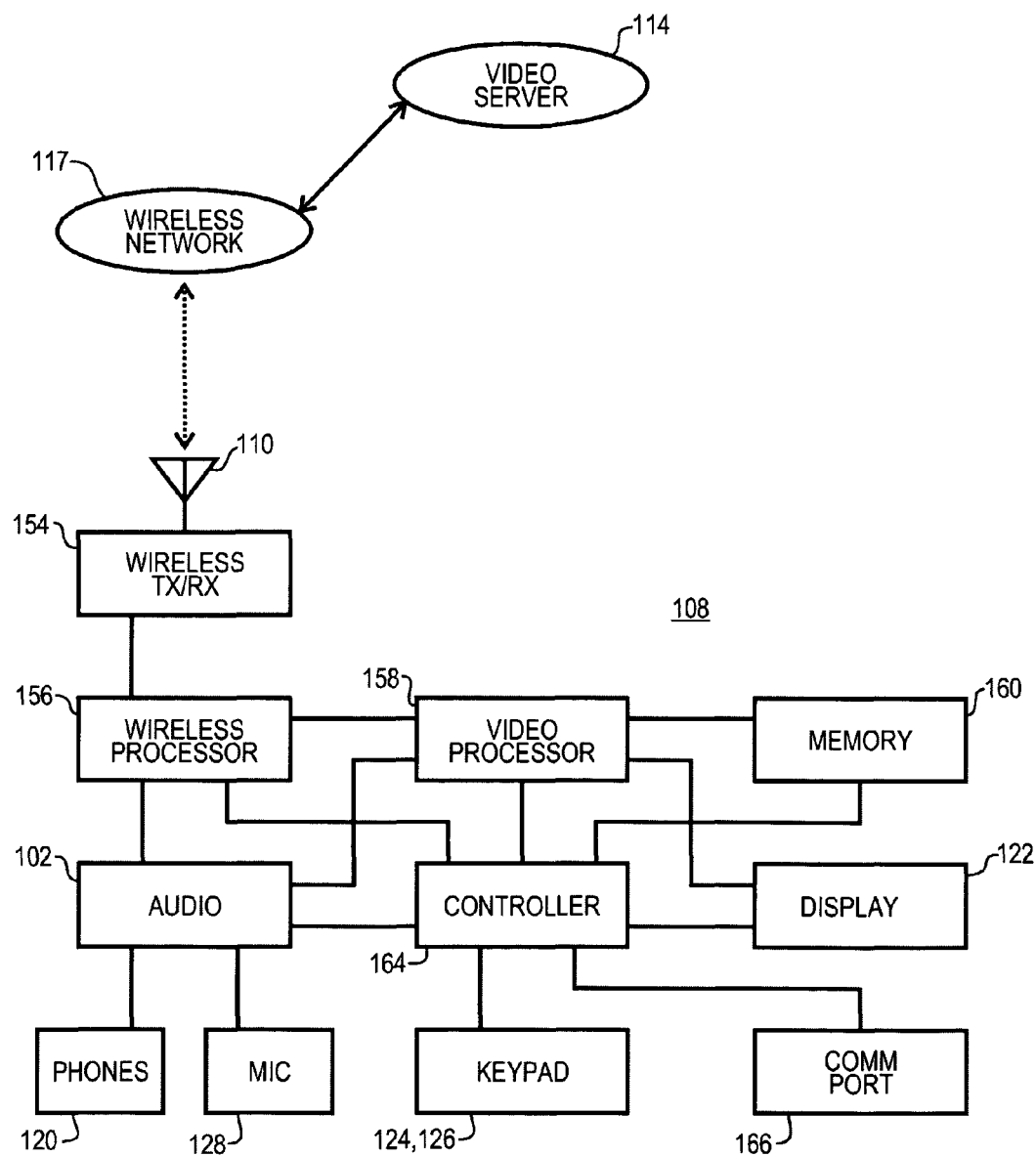
FIG. 8 is a functional block diagram of an illustrative embodiment of the present invention.

Reference is directed to FIG. 8, which is a functional block diagram of the streaming video display illustrative embodiment, similar to that discussed respecting FIG. 5. In FIG. 8, a video server 114 is directly coupled to the wireless network 117. The sequence of actions that are preprogrammed are directed to accessing a particular video "channel" from the specific network address of the video server 114. These constitute the preference parameter and destination parameter, respectively. The wireless telephone 108 includes a wireless antenna 110, which couples wireless signals with the wireless network 117. The wireless signals include all those signals utilized by a G3 wireless telephone, including wireless protocol overhead, audio signals, data signals, including network message signals, and streaming video signals. The wireless network 117 can be a GSM network, CDMA network, or any other standard or proprietary wireless protocols as are known to those skilled in the art, or that later become available.

The wireless telephone 108 in FIG. 8 includes the wireless transceiver 154. The wireless transceiver 154 couples wireless signals with the wireless network 117 via antenna 110. The demodulated wireless signals are coupled with wireless processor 156, which couples data signals with main controller 164, as well as audio signals with audio circuit 102. Note that wireless transceivers and wireless processors are known to those skilled in the art. The data signals coupled between the wireless processor 156 and the main controller 164 include network messages, which carry destination parameters and preference parameters, as well a preferred information. Note that the wireless processor 156 and the main controller 164 may be discrete computing devices, or they may be combined into one or more discrete computing devices. A digital signal processor is a suitable device for implementing these functional components.

A video processor 158 is coupled to the wireless processor 156 and the main controller 164. The video processor handles the decompression and display driving functions during video transfer. In addition, the video processor 158 provides an output to the audio circuits 102, in the case where the streaming video includes audio content. A memory 160 is coupled to main controller 164 and the video processor 158, which provides storage for video information, object code software, preprogrammed sequences of action, destination parameters, preference parameters, and preferred information. The size of memory 160 is scaled to meet the requirements of the illustrative embodiment. The audio circuit 102 is also coupled to the wireless processor 156, and serves to condition audio signals to and from the earphones 120 and microphone 128, respectively, of the wireless telephone 108, as is customary in wireless telephones. The display 122 is coupled to the video processor 158 and the main controller 164, both of which can drive the display with preferred information, typically recalled from memory 160 after having been received from the wireless network. In streaming video mode, the video processor can receive video information from the wireless processor 156 and direct the display 122 directly. The keypad 126 and TV button actuator 124 are coupled to the main controller 164.

A communications port 166 is coupled to the main controller 164. The communications port 166 may be a serial port, such as USB port or other communications port known to those skilled in the art. The communication port 166 can be used as an output coupling to and external output device, such as a video recorder or external video display (not shown). The communication port 166 can also be utilized as an input port for receiving a preprogrammed sequence of actions or preference and destination parameters from and external computing device. In one embodiment, sequence of action and parameters are created in a personal computer that has a more complete user interface than a wireless telephone user interface. Once created, this information is transferred to the wireless telephone through communications port 166.

Figure 9:
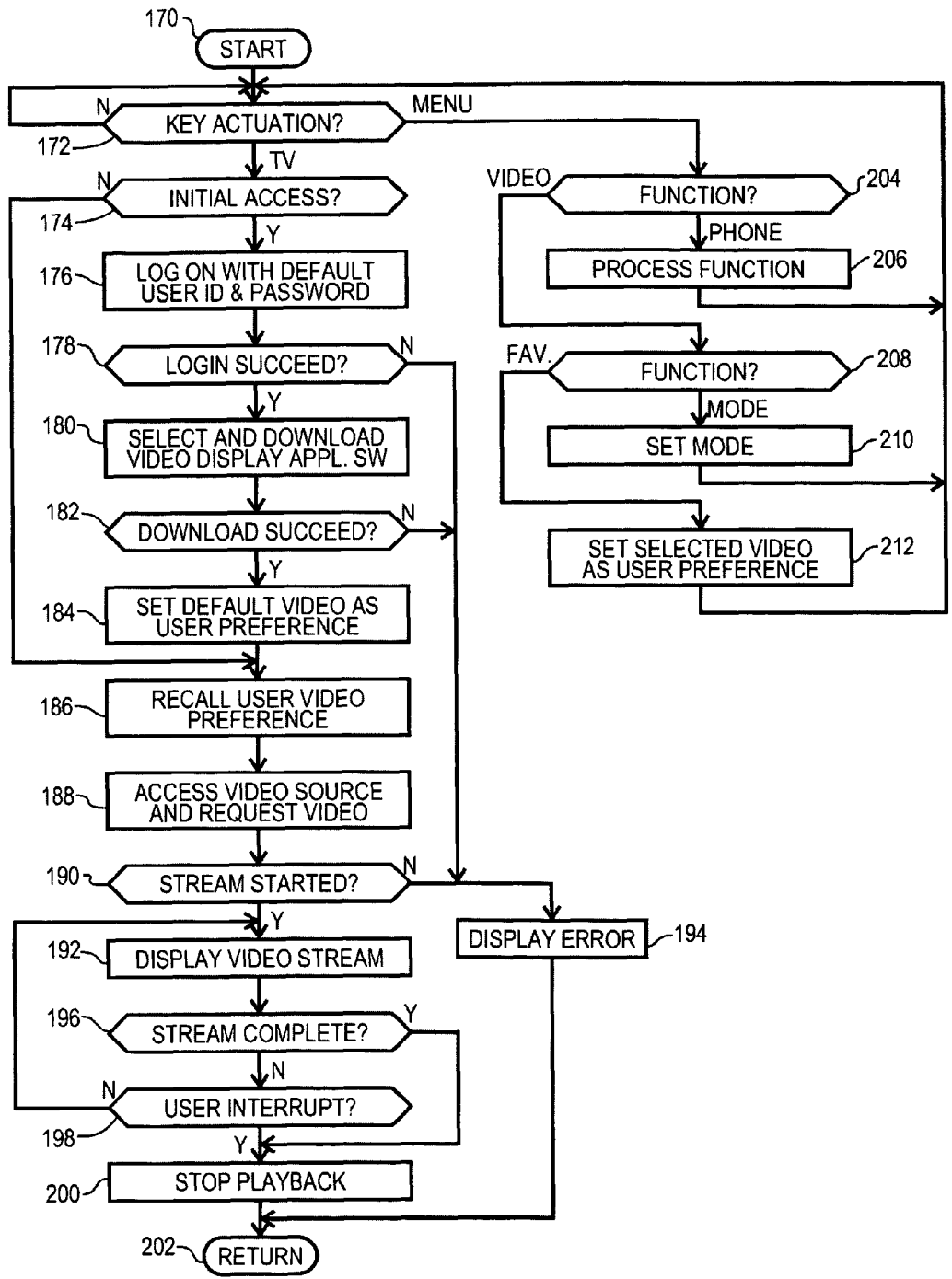
FIG. 9 is a process flow diagram of an illustrative embodiment of the present invention.

Reference is directed to FIG. 9, which is a process flow diagram of a streaming video application in a wireless network terminal embodiment of the present invention. The process begins at step 170 and proceeds to step 172, where a test is made to determine if the TV key or a menu key have been actuated. If the menu key has been actuated, then flow proceeds to step 204, where a test is made to determine if the device is in the phone mode or video mode of operation. If the phone mode is enabled, then the selected phone function is processed at step 206 and flow returns to step 172. The phone functions could be any suitable function known to those skilled in the art. On the other hand, at step 204, if the video mode is enabled, then flow proceeds to step 208. Step 208 is a test is made to determine whether the mode is being changed or a favorite channel is being selected. If the mode is selected at step 208, then the mode is set at step 210 and flow returns to step 172. The mode could be the video mode, the phone mode, or other mode, depending on the capabilities of the device. On the other hand, at step 208, if a favorite channel is being selected, then the preference parameter is changed to reflect the new user preferences at step 212. Step 212 is one way of changing the user preference parameter, which is in addition to changing the parameter be preprogramming. After storing the changed parameter at step 212, flow returns to step 172.

Again considering step 172 in FIG. 9, if the user has actuated the TV key, then flow proceeds to step 174. Step 174 is a test to determine whether the present TV actuator actuation is the initial access for the system. This test may be accomplished with a software flag that is reset after the initialization process is completed. If the current actuation is the initial actuation, then flow proceeds to step 176. At step 176, a preprogrammed login sequence is executed, which includes a default user identity and password. The default values are preprogrammed into the device, typically prior to the sale of the device to an end user. The login is accomplished through the network to a network address, which is part of the preprogrammed destination parameter. At step 178, a test is made to determine if the login has succeeded. If not, then flow proceeds to step 194, where a suitable error message is displayed. On the other hand, at step 178, if the login was successful, then flow proceeds to step 180. At step 180, the process selects and downloads the appropriate video display application software that is required for the current default video channel. The video software is a menu choice at a network destination. The destination is a part of the destination parameter, and the menu choice is a part of the preference parameter, both of which are preprogrammed for the initial access attempt. At step 182 a test is made to determine if the software download succeeded. If not, flow proceeds to step 194 where a suitable error message is displayed. On the other hand, at step 182, if the download succeeded, then flow proceeds to step 184.

Step 184 in FIG. 9 sets the default video channel, which is the channel preprogrammed or provided through the network during initialization, as the default video channel for future access. The default channel is part of the preference parameter. Upon completion of step 184, the initialization sequence is complete. Flow proceeds to step 186. Also, at step 174, if the TV button actuation is not the initial actuation, flow proceeds to step 186 as well. Thus, step 186 begins the routine sequence of actions where the access is no longer the initial access. At step 186, the process recalls the stored user video preference. This includes both the network destination, defined by the destination parameter and the preferred video channel, defined by the preference parameter. It also includes a partial sequence of actions needed to navigate to the network location where the video content is located. At step 188, the recalled information is communicated through the network so as to access the preferred information, namely the user's preferred video content. At step 190, a test is made to determine if the video stream has begun. If not, then flow proceeds to step 194 where a suitable error message is displayed to the user. If the video stream has begun at step 190, then the video is processed and routed to the display of the wireless network terminal. The process remains in streaming mode, with periodic tests for completion of the video stream at step 196 and possible user interrupts at step 198. If either of these events occurs, then the video stream display is terminated at step 200. The process returns at step 202. Similarly, after any of the error display conditions from step 194, the process likewise returns, allowing for a retry or other corrective action.

Figure 10:
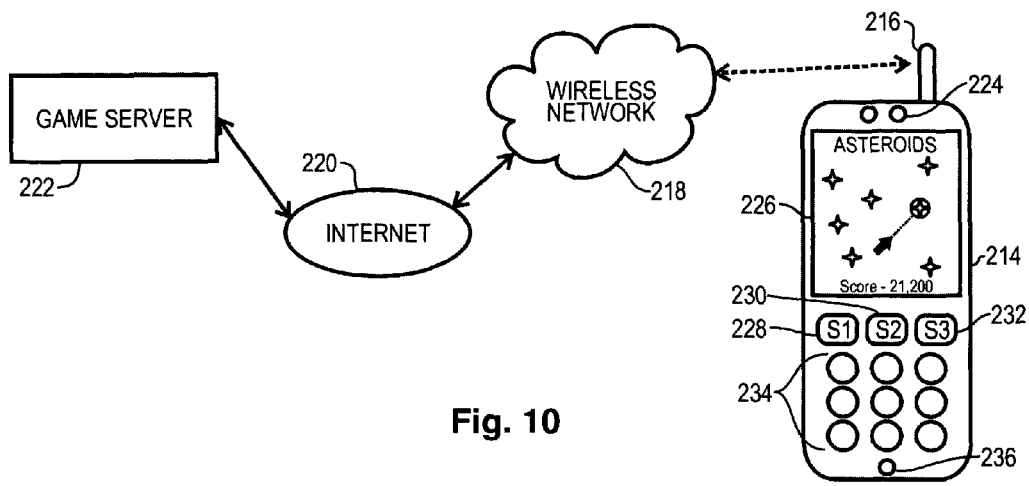
FIG. 10 is a system diagram of an illustrative embodiment of the present invention.

Reference is directed to FIG. 10, which is a system diagram of an illustrative embodiment of the present invention. This embodiment illustrates an application of the present invention where a network accessible game is played, with game-state parameters saved so that the game can be played during plural time periods, while retaining continuity of the action. A wireless network terminal device 214 is operable to communicate with a wireless network 218 through an antenna 216. The wireless network 218 is coupled to the Internet 220, and supports the TCP/IP protocol. A game server 222 is located at a specific URL on the Internet. The user plays a game on the wireless terminal 214 that is downloaded from the game server 222. Game state metrics are stored in the wireless terminal 214, that enable the game play to be interrupted, but with continuity of action. The URL and game menu selection data for the desired game are the destination parameters, and the game state metrics are the preference parameters. The wireless terminal 214 is a G3 wireless telephone in this embodiment, however other terminal devices are equally applicable, such as a personal computing device, PDA, wireless enabled GPS receiver, etc. Being a wireless telephone, the terminal includes an earphone 224, a display 226, a telephone keypad 234, and a microphone 236. There are three softkey actuators 228, 230, and 232. Each is independently programmable with one being programmed for the game embodiment.

Figure 11:
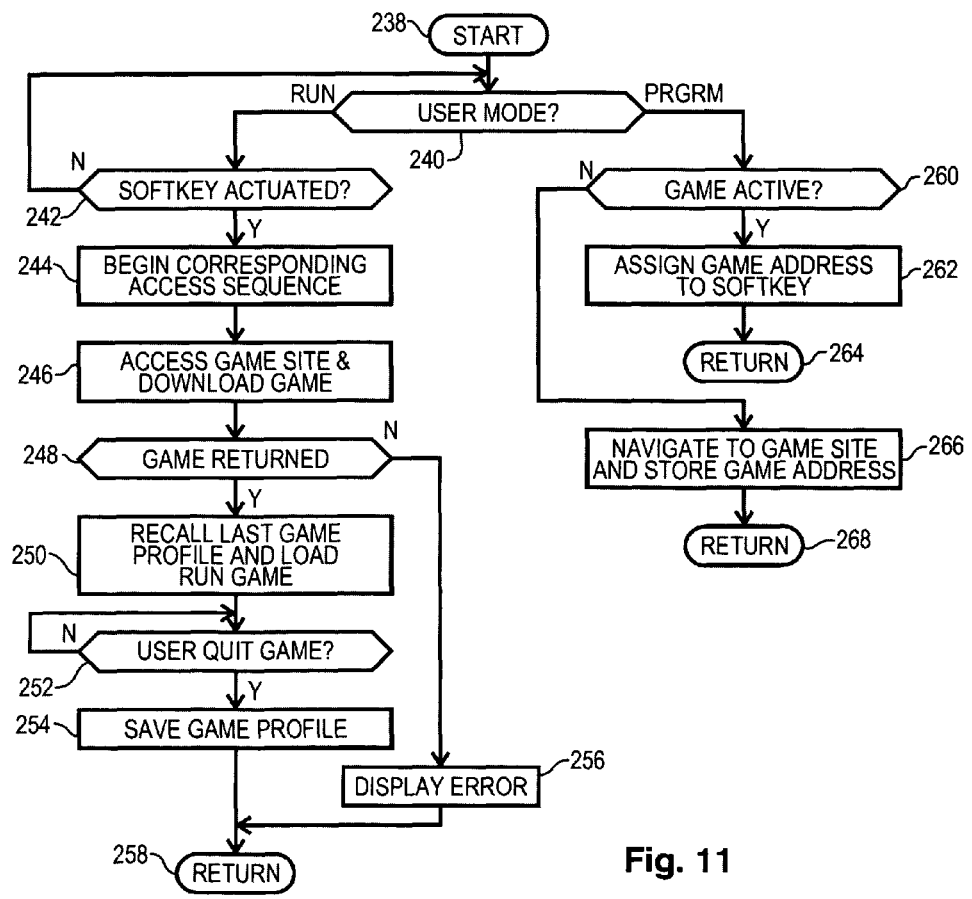
FIG. 11 is a process flow diagram of an illustrative embodiment of the present invention.

Reference is directed to FIG. 11, which is a process flow diagram corresponding to the game embodiment described with respect to FIG. 10. The process in FIG. 11 begins at step 238 and proceeds to step 240. Step 240 is a test to determine whether the run mode or program mode is presently active. If the program mode is active, then flow proceeds to step 260, where a test is made to determine of a game is currently active. If a game is active, then flow proceeds to steep 262, where the network address of the active game is programmed, or stored as the destination parameter default for the presently actuated softkey. Flow then proceeds to step 264, which returns to step 238. On the other hand, at step 260, if there is no game presently active, then flow proceeds to step 266. At step 266, the user navigates to a preferred network location and selects a game from the available choices. The navigation process is recorded in macro fashion, together with the network address involved as the destination parameter for the active softkey. Upon completion, flow proceeds to step 268, which returns to step 238.

Again considering step 240 in FIG. 11, if the mode is in the run mode, then flow proceeds to step 242. Step 242 is a test to determine if the softkey has been actuated by the user. If not flow returns to step 240. On the other hand, if the softkey has been actuated at step 242, then flow proceeds to step 244. Step 244 begins the recorded sequence of actions executed to access the preferred game. At step 264, the network location of the game is accessed, the preferred game is accessed and downloaded for play. Step 248 is a test to determine if the download succeeded. If not, then flow proceeds to step 256 where a suitable error message is displayed. If the game download succeeds at step 248, then flow proceeds to step 250. At step 250, the previously stored game state is recalled, which constitutes the preferred parameter in this embodiment. The game is played. Step 252 is a test to determine if the user has completed play. If play is complete, then flow proceeds to step 254, where the present game state parameters are stored for use in subsequent access to the game. The process then returns at step 258. Similarly, after any of the error display conditions from step 256, the process likewise returns, allowing for a retry or other corrective action.

The foregoing illustrative embodiments are based on a wireless telephone network terminal device accessing a wireless network. However, those skilled in the art will appreciate that the teachings of these embodiments are equally applicable to other network terminal devices operating of like or different kinds of networks. Other wireless devices, such as wireless enabled personal computing devises, personal digital assistants, and other wireless devices can be employed. Wired or wireless networks can be applied equally as well. The preference parameters discussed in the foregoing illustrative embodiments applied geographic metrics and video preferences. However, other embodiments are contemplated as well. A temporal parameter can be employed to find preferred information relative to a preferred time or date. For example, the latest music published by a favorite performer. The current news headlines from a news web site. The first occurrence of an event after a specific date, and so forth. Similarly, probabilistic metrics can also be used as preferred parameters. For example, search of the most popular song currently played by a radio station. Ordinal, and other metrics can be used, as will be appreciated by those skilled in the art.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A method of obtaining gaming content and video content available from network servers located on a network using a wireless network terminal device having a gaming actuation input, a video actuation input, and a display, comprising the steps of:
  (I) obtaining gaming content by executing in the wireless terminal the following steps (a et. seq.) through (c)
  (a) storing a first destination parameter corresponding to a first network address for a gaming content network server and indicative of first preferred information, related to a game application program, in the wireless network terminal device;
  (b) in response to an initial single actuation of the gaming actuation input;
    (1) accessing a first network server addressed according to the stored first destination parameter by the wireless network terminal device, thereby requesting the first preferred information;
    (2) upon receipt of the first preferred information from the first network server by the wireless network terminal device, setting an initial state of the game parameters within the wireless network terminal as the game profile, and executing the game application program in the wireless network terminal device in accordance with the game profile;
  (c) in response to a subsequent single actuation of the gaming actuation input;
  suspending execution of the game application program and storing the current state of the game parameters within the wireless network terminal as the game profile, thereby enabling subsequent execution of the game application software at the current state; and
  (II) obtaining video content by executing in the wireless network terminal the following steps (d) through (j):
  (d) in response to an initial actuation of the video actuation input;
  (e) forwarding a default user identity and default password to a second network server containing video content, which is addressed on the network according to a second predetermined destination parameter;
  (f) downloading a video driver from the second network server that is adapted to execute on the wireless network terminal device;
  (g) storing a default video selection preference parameter in the wireless network terminal device that selectively defines a portion of the video content available on the network server as second preferred information, and
  (h) in response to subsequent single actuations of the video actuation input;
  (i) forwarding the second preference parameter into the network by the wireless network terminal device, addressed according to the second destination parameter, as a request for the second preferred information from the second network server, and
  (j) upon receipt of the second preferred information from the second network server by the wireless network terminal device, outputting the second preferred information to the display.

2. The method of claim 1 wherein the single actuation is accomplished with a user actuated actuator.

3. The method of claim 1 wherein the single actuation is accomplished by a software driven actuator.

4. The method of claim 1 wherein the single actuation is accomplished on receipt of a network message.

5. The method of claim 1 wherein the first destination parameter and second destination parameters are relative network addresses or absolute network addresses.

6. The method of claim 1 wherein the second destination parameter includes a menu selection parameter.

7. The method of claim 1 wherein the second destination parameter includes an application software specification.

8. The method of claim 1 wherein the second destination parameter includes a search term for operation of a network search engine.

9. The method of claim 1 further comprising the steps of:
programming the second destination parameter, and
programming the second preference parameter.

10. The method of claim 9 wherein said programming steps are executed by a user.

11. The method of claim 9 wherein said programming steps are executed by remote programming through the network.

12. The method of claim 1 wherein the second preference parameter includes a search term for operation of a network search engine.

13. The method of claim 1 wherein the second preference parameter includes a video content specification.

14. The method of claim 1 wherein the second preference parameter includes application software configuration parameters.

15. The method of claim 1 wherein the second preference parameter includes temporal parameters.

16. The method of claim 1 wherein the second preference parameter includes probabilistic metrics.

17. The method of claim 1 wherein the first destination parameter is a relative network address or an absolute network address.

18. The method of claim 1 wherein the first destination parameter includes a menu selection parameter.

19. The method of claim 1 wherein the first destination parameter includes an application software specification.

20. The method of claim 1 wherein the first destination parameter includes a search term for operation of a network search engine.

21. The method of claim 1 further comprising the steps of:
programming the first destination parameter, and
programming the first preference parameter.

22. The method of claim 1 wherein the first preference parameter includes application software configuration parameters.

* * * * *